Feb. 27, 1945.  H. GUTMAN  2,370,402
AMBULANCES AND THEIR EQUIPMENT
Filed March 4, 1942  2 Sheets-Sheet 1

INVENTOR:
Henry Gutman
BY
ATTORNEY

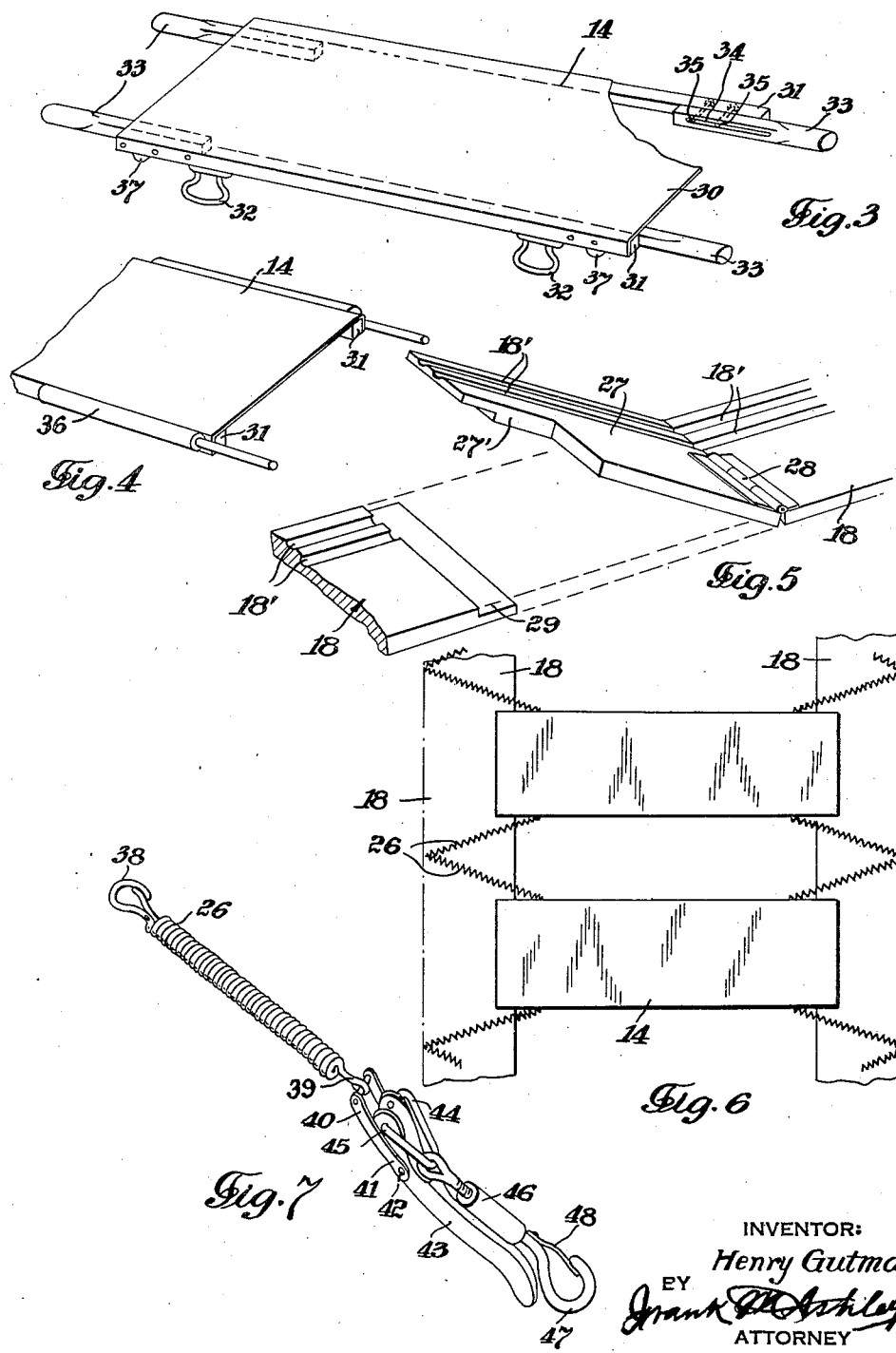

Patented Feb. 27, 1945

2,370,402

UNITED STATES PATENT OFFICE 2,370,402

AMBULANCE AND ITS EQUIPMENT

Henry Gutman, New York, N. Y.

Application March 4, 1942, Serial No. 433,247

5 Claims. (Cl. 296—19)

My invention relates to ambulances and their equipment.

The object of my invention is to provide an ambulance and its equipment. A further object is to provide a construction in which a truck of light weight is used for general trucking purposes and which may be immediately converted into an ambulance which is capable of carrying a number of persons in either a sitting posture, or on stretchers that are suspended on springs attached to the opposite sides of the vehicle.

Further objects of the invention are described, together with improvements in the stretcher construction and the advantages attained by their use.

Figure 1:
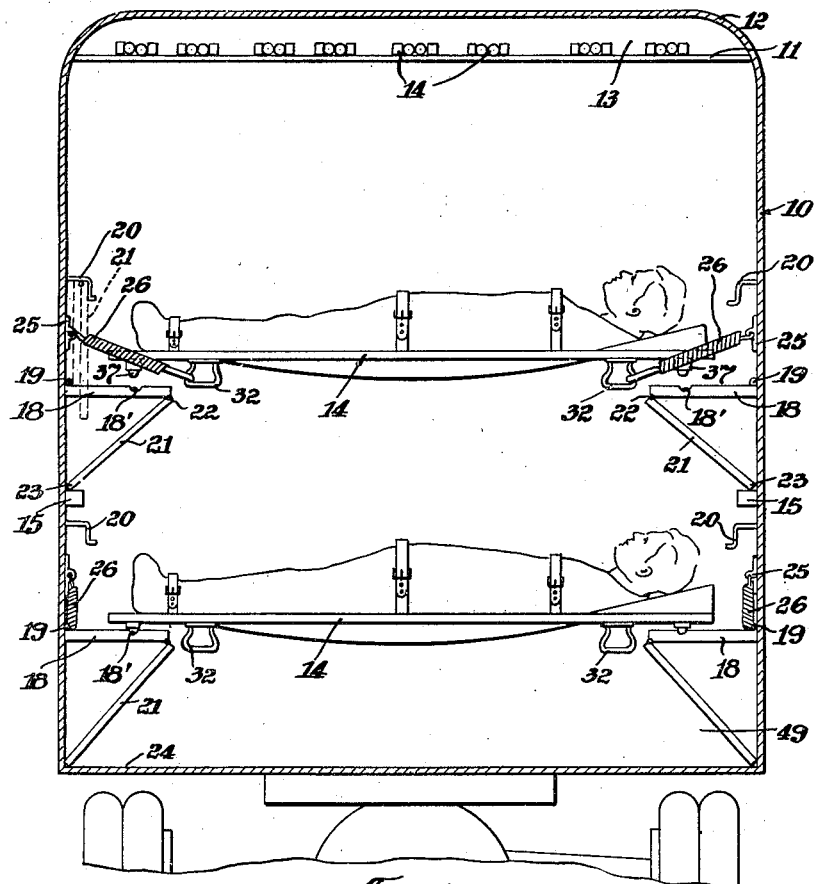
Figure 2:
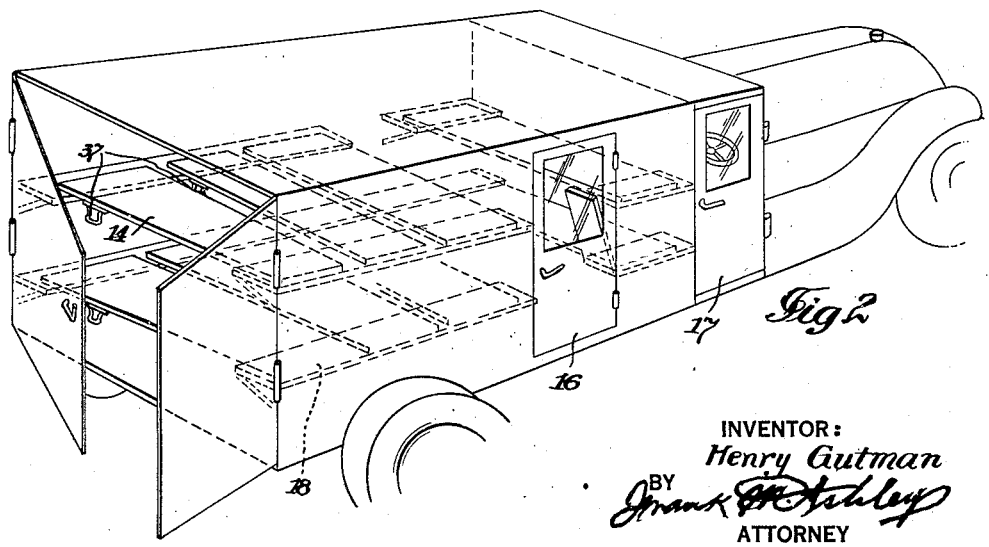

Referring to the drawings which form a part of the specification:

Fig. 1 is a rear end view of a truck body and doors, and disclosing the interior thereof together with a number of persons carried on stretchers which are carried on spring supporting members, Fig. 2 is a perspective view of the truck with stretchers resting in position therein, Fig. 3 is a perspective view of a stretcher in which one form of construction of telescopic handles is shown, Fig. 4 is a perspective view of a part of a stretcher in which another construction of handles is illustrated, Fig. 5 is a perspective view of a portion of the rail and seat construction located adjacent two oppositely positioned side doors in the body of the vehicle, Fig. 6 is a plan view illustrating one arrangement of the springs which support the stretchers, Fig. 7 is a perspective view of a means used for connecting the springs to the stretchers, and for increasing the initial tension of the springs after the stretchers are in position in the vehicle.

10 indicates a light truck that is suitable for use as an ambulance, and is sufficient in width to accommodate a person lying on a stretcher which extends nearly across the width of the body portion.

The body is provided with a partition 11 which is located a predetermined distance below the top wall 12 of the body, and provides a space 13 in which folded stretchers 14 may be stored, which stretchers extend lengthwise of the body and may be easily removed from the rear end thereof.

15—15 respectively, indicate abutments which extend from the rear end of the body to the near side of the doors 16 and are permanently attached to the side walls of the body.

Similar abutments are located on the far side of the doors to serve the same purpose, hereinafter more fully described.

17 indicate doors, oppositely disposed, for use by the driver of the vehicle.

18—18 etc. indicate bench-like seats which are located above the abutments 15 and extend the same distance lengthwise thereof and positioned relative thereto substantially as illustrated.

The seats 18 also serve as rails which serve to carry the stretchers, and are provided with one or more grooves 18', which extend lengthwise thereof, and serve to guide the stretchers to their proper position.

The seats are hinged to the side walls at 19 to permit them to be swung upwardly, and are held in their upward position by spring clasps 20 or other suitable means, said means being fixed to the side walls of the vehicle.

The seats also carry props 21—21 respectively, which are hinged at 22 with their lower ends resting at 23 on the abutments 15, as illustrated in the upper seats, or on the floor 24 of the vehicle, as illustrated in the lower tier.

The lower ends of the props may be secured to the abutments or to the side walls, if desired, in any suitable manner by means permitting their easy detachment.

A number of brackets 25 are fixed to the side walls at a proper distance above the seats, and serve to hold the springs 26 to said walls.

The springs may be held in detachable relation with the brackets by snap hooks, or other suitable means.

I prefer to use one bracket to hold the ends of two springs, one of said springs extending therefrom to one adjacent stretcher, and the other spring extending to another adjacent stretcher, as illustrated in Fig. 6 whereby the springs extend at an angle to the median line of the stretchers, and serve to prevent swaying movement thereof when under tension, as will be readily understood.

The above arrangement also positions the springs a greater distance from a person resting on a stretcher.

Referring to Fig. 5 it will be seen that the seat 18 is extended by a separate portion 27 which is hinged at 28 to the seat portion located at the forward end, thus permitting the portion 27 to be swung upwardly and held out of the path of the door entrance to permit entry into the vehicle, and when lowered, the free end of the portion rests on the adjacent end of the seat at 29 as illustrated, thus forming a continuous rail for movement of the stretchers at the forward end of the vehicle.

The seat portion 27 is cut away at one corner thereof as illustrated at 27' to permit said portion to swing beyond the bracket 25 and retainer element 20 and spring 26 attached to the bracket.

The space 49 below the lower positioned stretchers is sufficiently high and wide enough to permit a person to move from one end of the vehicle to the other by crawling.

When the vehicle is used as a truck for general use, the seats are folded upwardly and secured by the latches 20, and if no stretchers are in use, or only some of them, the seats may be used to sit upon, and boards may be used as further seats by placing them across from the seats at one side to those at the other side, and thus a larger number of persons may be easily carried.

The stretchers 14 are formed and made in the usual manner, comprising a sheet of flexible material 30 which is secured to side frame portions 31 of wood, or other suitable material, and provided with legs 32 which serve as handles in some of the operations of lifting a person when on the stretcher, into the vehicle, and also serves to hold one end of the pair of springs used to support the stretcher.

Secured to the stretcher frame in slidable relation are handles 33, the inner ends of which are slotted at 34 and pins 35 extend therethrough to hold the parts together, the object being to permit the handles to rest under the canvas 14 when the stretcher is in the vehicle.

The construction shown in Fig. 4 is for the same purpose, and consists of tubes 36 fastened to the frame, and handles fitting therein in slidable relation.

Attached to the under side of the frame are ball or roller bearings 37 which fit into the grooves 18' and guide the stretcher in its movement.

Referring to Fig. 7, the spring 26 is shown with one end formed into a hook 38 for attachment to a bracket 25, and its opposite end having a hook 39, or ring, connected to a ring 40 formed to provide a bifurcated frame, the free ends 41 of which are attached at 42 to a lever 43, and a bifurcated link 44 is connected to the lever at 45, thus forming a toggle construction.

A turnbuckle 46 is connected to the link 44 and carries a hook 47 for engagement with a leg of the stretcher, as illustrated in Fig. 1.

The hook may be provided with a lock-guard 48 which is mounted thereon in swivelling relation.

When this device is connected with the stretcher in position in the vehicle, with a person on the stretcher, and the free end of the lever resting at a distance from the hook 47, the spring 26 may be further tensioned by moving the lever up to the turnbuckle, and thus serve to further elevate the stretcher.

When used as an ambulance in time of war or where needed in unusual emergencies, it is best that three persons shall act together in placing persons on the stretchers into the vehicles, and removing them therefrom.

Assuming that eight persons are to be loaded into the vehicle on stretchers, they may be loaded in the following manner:

The first stretcher is lifted and placed on the rear ends of the lower rails and pushed to the end of the side walls beyond the doors 16 and properly suspended from the springs, by the attendants; then the next stretcher is pushed through in the same manner, and lifted to the space above the first; then the third one is pushed to the forward end and lifted to the upper tier and pushed back to the rear end of the vehicle; the fourth and fifth following in the same manner; the doors 16 are then closed and the adjacent seat portions lowered, and thereafter the remaining stretchers are pushed successively into the vehicle on the lower rails and each is suspended by the attendants as they reach their successive positions, as will be readily understood.

If a vehicle is used in which there are no doors leading into the interior of the body at its forward end, such as the doors 16, the upper seat-rails may be shortened to provide space for the stretcher to be lifted into position on the upper rails by attendants standing at the ends of said rails.

Two men working together can handle a stretcher with a person thereon by first raising one end thereof from the seat-rail and connecting the springs to the stretcher, thus lifting only part of the weight from the adjacent rail at a time, and then lifting the opposite end and repeating the operation.

By reason of the spacing of the stretchers from each other, as illustrated in Fig. 6, space is provided for a man to stand at each side of a stretcher in performing the act of lifting and attaching the stretcher to the springs.

It will be obvious that a special ambulance may be made in which the arrangements and constructions above set forth may be incorporated and I therefore do not wish to be limited to the conversion of a truck for ambulance purposes, and that I shall be limited only by the scope and limitations defined by the claims allowed.

It will be also obvious that many details of construction may be changed without departing from the disclosure of novelty presented herein.

Having thus described my invention, I claim as new:

1. A vehicle of the character described, comprising a body having parallel side walls, seat-rails extending longitudinally of said body for supporting stretchers extending transversely of the vehicle body as the said stretchers are moved to predetermined position in the body, springs connected at one end with the side walls above said seat-rails, means for attaching the opposite ends of the springs to a stretcher when resting on said seat-rails and toggle connections for tightening said springs to resiliently support the stretcher above the seat rails in a position transverse of the vehicle body.

2. A vehicle of the character described, comprising a body having parallel side walls extending lengthwise of the vehicle, a seat-rail extending along each side wall at a lower level and attached thereto in hinged relation for movement from a stored position in which said seat-rail is folded against the side wall to an operative position in which said seat-rail supports and guides a stretcher being moved longitudinally of the vehicle body, said stretcher being disposed crosswise of said body, a second seat-rail extending along each side wall at an upper level and attached thereto in hinged relation for movement from a stored position to a stretcher supporting position, said upper level seat-rail having therein a gap of a width not less than the width of a stretcher and spaced from the forward end of the vehicle by a distance not less than the width of a stretcher, a door in the side wall of the vehicle body in alignment with the gap in the upper level seat-rail, said lower level seat-rail having a separable section extending across the said door.

3. In a vehicle of the character described comprising a body having parallel side walls, the combination of seat rails extending along each side wall and attached thereto in hinged relation for movement from a stored position in which said seat-rail is folded against the side wall to an operative position in which said seat-rail projects horizontally from said side wall to serve both as a seat for passengers and as a slide rail for conveying stretchers longitudinally of the vehicle body, a stretcher having side rails, rollers provided on the lower sides of said side rails for rolling the stretcher transversely of the side rails, said seat rail having in its upper surface a longitudinally extending groove adapted to receive said rollers and guide the stretcher when it is positioned transversely of said vehicle body and is being moved longitudinally of the vehicle to predetermined position and means for resiliently supporting the stretcher in a position transverse of said vehicle body and independently of said seat.

4. A vehicle of the character described comprising a body having parallel side walls, seat-rails extending longitudinally of said body for supporting stretchers extending transversely of the vehicle body as the said stretchers are moved longitudinally of said body to predetermined position in the body, springs connected at one end with the side walls above said seat rails and means for attaching the opposite ends of the springs to a stretcher to support the stretcher in a position transverse of the vehicle body, the points of attachment being such that the springs when supporting a loaded stretcher extend at an acute angle to the horizontal plane and the median line of the stretcher to prevent swaying movement thereof.

5. In a truck body having a floor, vertical side walls and a roof, the combination of a seat extending longitudinally along each side wall and attached thereto in hinged relation for movement from a stored position in which said seat is folded flat against said side wall to a horizontal, operative position, to provide seats for passengers, said side walls remaining in vertical position during movement of said seats from one position to the other, said seats when in said operative position serving also as a slide rail for conveying stretchers longitudinally of the truck body, said stretchers extending transversely of the truck body during such movement, and springs connected at one end with said side walls above said seats and provided at the other end with means for attaching said springs to a stretcher to resiliently support the stretcher in a position transverse of the truck body and independently of said seats, said springs when supporting a loaded stretcher extending at an acute angle to the horizontal plane and at an acute angle to the median line of the stretcher to prevent swaying movement thereof and impact with said side walls.

HENRY GUTMAN.